United States Patent [19]

Drewery et al.

[11] 4,288,810
[45] Sep. 8, 1981

[54] METHOD OF AND APPARATUS FOR DERIVING A PAL COLOR TELEVISION SIGNAL CORRESPONDING TO ANY DESIRED FIELD IN AN 8-FIELD PAL SEQUENCE FROM ONE STORED FIELD OR PICTURE OF A PAL SIGNAL

[75] Inventors: John O. Drewery, Coulsdon; Richard Storey, Sutton, both of England

[73] Assignee: British Broadcasting Corporation, London, England

[21] Appl. No.: 43,540

[22] Filed: May 29, 1979

[30] Foreign Application Priority Data

May 30, 1978 [GB] United Kingdom .............. 23924/78
May 30, 1978 [GB] United Kingdom .............. 23925/78

[51] Int. Cl.³ ..................... H04N 9/39; H04N 9/535
[52] U.S. Cl. ..................................... 358/16; 358/21 R
[58] Field of Search ................ 358/10, 16, 21, 24, 358/40

[56] References Cited

U.S. PATENT DOCUMENTS 3,567,862  3/1971  Carnt et al. ..................... 358/10

FOREIGN PATENT DOCUMENTS 2640759  3/1978  Fed. Rep. of Germany.

Primary Examiner—Robert L. Richardson
Attorney, Agent, or Firm—Robert F. O'Connell

[57] ABSTRACT

A single field of a PAL color television signal is stored in a store (50) and provides a signal at an input (52). The signal is delayed by one-line delays (56,58) in series to provide one and two-line delayed signals. Separate switching units (60,62) select desired ones or combinations of the input and delayed signals to constitute respectively the low-frequency and chrominance part of the signal at the output (82). The switch positions are changed between fields, and for at least some fields of the PAL sequence each component of the output signal is formed by combining signals from more than one line, i.e. a halving adder (64;66) averages successive lines for the low frequency part of the signal and a halving subtractor (68) forms the difference between lines two lines apart for the chrominance part. The selector unit outputs are combined in an adder (78) which receives the output of the first selector (60), and also the difference between the output of the two selectors after band pass filtering (76). The store (50) can be replaced by a random access store capable of outputting three successive lines simultaneously. The apparatus has special utility in equipment for movement portrayal.

15 Claims, 6 Drawing Figures

METHOD OF AND APPARATUS FOR DERIVING A PAL COLOR TELEVISION SIGNAL CORRESPONDING TO ANY DESIRED FIELD IN AN 8-FIELD PAL SEQUENCE FROM ONE STORED FIELD OR PICTURE OF A PAL SIGNAL

This invention is concerned with deriving a PAL colour television signal corresponding to any field in an 8-field PAL sequence from one stored field or picture of a PAL signal.

For a PAL System I signal with a colour subcarrier frequency $f_{sc}$ of 4.43 MHz, there is no particular difficulty in providing suitable luminance information in the frequency range up to about 3 MHz. The main problem is to derive the correct phase of the chrominance subcarrier relative to line and field synchronising pulses. In a conventional PAL signal, this phase relationship is repeated at intervals of 8 field periods. This is caused by the offset of the colour subcarrier frequency from the picture frequency, and means that a completely faithful representation of the original signal can only be obtained by storing the signals from eight successive fields. In applications where motion is arrested, however, it is necessary to display the information from a single field and if due allowance is not made for the eight-field cycle the frozen signal will exhibit colour flicker on those parts of the picture which correspond to coloured areas. This is especially true if the colour burst is not frozen, but if it is frozen along with the picture there is a transient situation at the beginning of each field whilst the burst-locked oscillator relocks to the new burst phase, furthermore the signal is a non-standard signal. Depending on the characteristics of the burst-locked oscillator this may or may not cause a disturbance at the top of the active picture areas.

There is a need to extract the luminance and colour difference signals from the composite PAL signal on a given field and recombine them with differing subcarrier phases so as to generate approximations to the signals that would have been obtained on the other fields.

One requirement for this form of processing is in equipment which provides fast, slow or stop motion pictures from a recorded PAL video signal. One known method of performing this processing for an analogue PAL signal recorded as an F.M. signal on a magnetic disc is illustrated in FIG. 1 of the drawings. FIG. 1 shows a block circuit diagram of apparatus used for "stop motion" replay with a video disc store to obtain a continuous PAL signal from a single stored field. The apparatus 10 includes an input 12 which is connected to receive the analogue frequency modulated video signal from the disc stored and to which is connected a half-line delay element 14. A switch 16 selects the delayed or undelayed signal and applies it to an F.M. demodulator 18. The output of demodulator 18 is applied both to a 3.5 MHz low pass filter 20, which selects a signal representing the major part of the luminance component, and to a band-pass filter 22 centred on 4.4 MHz which selects a signal consisting predominantly of the chrominance components.

In this Specification reference is made to a 625 line 50 field per second interlaced PAL signal in which $f_{sc}$ is 4.43 MHz, but these numerical values are purely for convenience in illustration, and the invention is applicable to PAL signals on other standards.

The output of the band-pass filter 22 is applied to a one-line delay 24, and a switch S1 selects the delayed or undelayed signal. This signal is then applied to an inverter 26, which has an associated switch S2 for providing the inverted or non-inverted signal. The resultant signal is applied to one input of an adder 28, the other input of which receives the output of the low pass filter 20 to provide an output 30 which is the analogue video output of the apparatus. This can then be subject to timing correction to remove any timing fluctuations.

The circuit of FIG. 1 produces a continuous 625-line PAL signal from a single stored field repeated at intervals of $312\frac{1}{2}$ lines in the following manner. The $\frac{1}{2}$-line delay 14 is inserted during alternate field periods so that the video signal is available at intervals of alternately 312 and 313 line-periods. As a result, the picture information from line N of a stored odd field is repeated on line N+313 of even fields. After F.M. demodulation in demodulator 18, the video signal is split into luminance and chrominance components by means of the 3.5 MHz low-pass filter 20 and 4.4 MHz band-pass filter 22. The four different chrominance phases required during an 8-field sequence for both line N and line N+313 are obtained by the four different combinations of the positions of switches S1 and S2. Insertion of the inverter 26 by means of switch S2 changes the chrominance phase by $\pi$ without affecting the $\pm$V-axis switch. When the line delay 24 is inserted by operation of switch S1, the chrominance signal from line N is added in adder 28 to the luminance from line N+1. As a result, the phase of the U chrominance component is shifted by $\pi/2$ and the V-axis switch ($\pm$) is inverted.

Switches S1 and S2 remain in the same positions for the whole of any given field period. After the chrominance signal has been processed to have the required phase during each field period, it is added in adder 28 to the luminance signal to give a conventional PAL signal at the output.

It should be noted that the system described above and shown in FIG. 1 has the disadvantage that the chrominance information in a display of the output signal is shifted vertically with respect to the luminance information at a repetition rate of $12\frac{1}{2}$ Hz when a continuous PAL signal is being derived from a single stored field.

This invention is defined in the appended claims, to which reference should now be made.

This invention will be described in more detail, by way of example, with reference to the drawings, in which.

Figure 1:
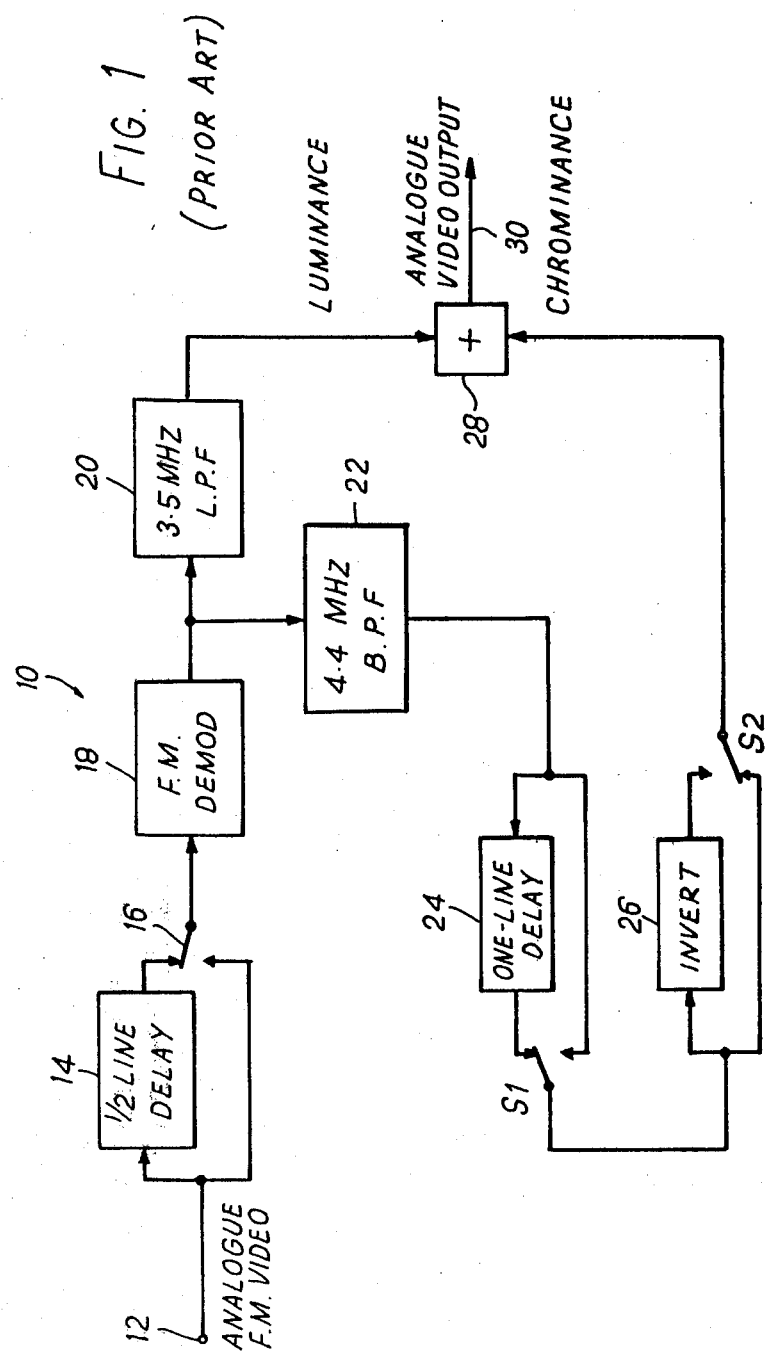
FIG. 1 (described above) is a block circuit diagram of a known system.
Figure 2:
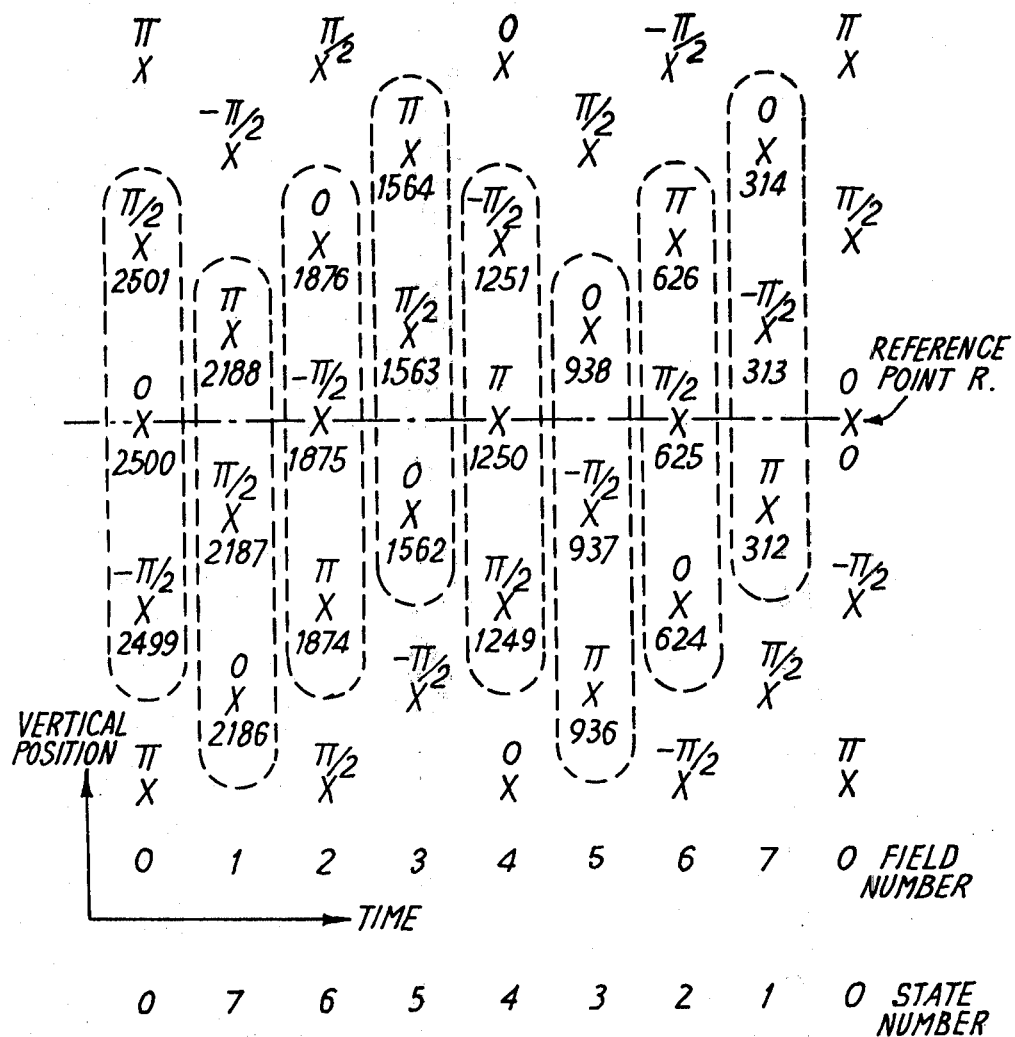
FIG. 2 is a diagram showing the subcarrier phases for different line numbers on a plot of vertical position against field number.

FIG. 2 shows the positions in vertical-temporal coordinates of the information on eight successive fields. That is, for each of the eight fields 0 to 7 of the PAL sequence, a cross in FIG. 2 indicates the vertical position in the picture of a line. Also shown are the approximate subcarrier phases of the lines relative to a reference line R. Several of the lines are given numbers showing the number of lines between them and the reference line R.

To produce the desired PAL sequence we consider the low and high-frequency parts of the signal separately. The low-frequency part, say below 3.3 MHz, contains luminance only, but the high-frequency part may contain both luminance and chrominance.

It is assumed that the field containing line R is an even field and this field is numbered field 0. The numbers of the other fields advance in time as shown in FIG. 2. Effectively the problem is to produce field 0 from each of the other fields in turn; this is equivalent to producing all eight fields from a single field and is easier to illustrate on a single figure. It is convenient to designate the state of the relationship of the reference field and the field from which it is produced as corresponding to the number of fields previous to the reference field from which the latter is produced. Thus, state 1 represents producing the reference field from field 7, and so on.

We shall also adopt the symbol $Z^{-N}$ to represent the transfer function of N line periods delay. Thus $Z^{-1}$ represents one line delay, $Z^{-625}$ one picture delay, and so on.

In accordance with this invention, we propose deriving the reference field from the preceding fields in the manner defined in the following Table I.

TABLE 1

| State | Low Frequency | High Frequency |
|---|---|---|
| 1 | $\frac{1}{2}(Z^{-313}+Z^{-312})$ | $\frac{1}{2}(Z^{-314}-Z^{-312})$ |
| 2 | $Z^{-625}$ | $\frac{1}{2}(Z^{-624}-Z^{-626})$ |
| 3 | $\frac{1}{2}(Z^{-937}+Z^{-938})$ | $\frac{1}{2}(Z^{-938}-Z^{-936})$ |
| 4 | $Z^{-1250}$ | $-Z^{-1250}$ |
| 5 | $\frac{1}{2}(Z^{-1562}+Z^{-1563})$ | $\frac{1}{2}(Z^{-1562}-Z^{-1564})$ |
| 6 | $Z^{-1875}$ | $\frac{1}{2}(Z^{-1876}-Z^{-1874})$ |
| 7 | $\frac{1}{2}(Z^{-2187}+Z^{-2188})$ | $\frac{1}{2}(Z^{-2186}-Z^{-2188})$ |

The low-frequency part of the signal is taken as the signal in exactly the same vertical position in even numbered states, but is taken as the average of the two nearest lines in the picture on odd numbered states. We have found that this averaging or interpolation is most important if undesired flicker is to be avoided. If only one line is used then there is a danger of flicker at 25 Hz, which is extremely noticeable.

For the high-frequency part of the signal, attention has to be paid to the relative phases of the colour subcarrier, these being marked on FIG. 2. States 4 and 0 are rather different from the other states 1, 2, 3, 5, 6 and 7, the considerations for which are as follows.

In each of these cases there are two lines which are two lines apart in the field one of which has the same phase as the reference line and one of which has a phase relation of 180° to it. To produce the reference line we propose combining the two lines by subtracting the line with phase π from the line with the reference phase, and halving the resultant.

The effect of this is as follows.

Chrominance information will add in the two lines which, when the resultant is halved, gives an average value corresponding to a position mid-way between the two lines. For states 2 and 6 this will mean that the information is vertically correct, i.e. it lies at the same vertical line in the picture as the reference line. For the odd-numbered states the information will be one picture line out of register with the reference line. Line-locked luminance information will subtract on the two lines and will thus be lost.

For states 3 and 5, the situation may be improved by combining the lines in the proportions $\frac{3}{4}$ to $\frac{1}{4}$, taking the larger amount of the line with zero phase (i.e. lines 938 and 1562 respectively). This will then provide vertical interpolation to the exactly correct position, and will allow a reduced (half-amplitude) amount of line-locked luminance to pass. For states 1 and 7 the same improvement cannot be made, because any improvement in the vertical positioning will worsen the situation for line-locked luminance, and vice versa.

In Table I, for state 4 the inverse of the line 4 fields earlier is taken to give the high-frequency part of the signal. This is in fact a poor compromise, as it means that line locked luminance information will also be inverted in the high-frequency region. A better approximation may therefore be to take the sum of the two lines to either side of line 1250 and subtract line 1250 from them. The chrominance information in lines 1251 and 1249 is 180° out of phase and will cancel, leaving the chrominance information from line 1250. Line-locked luminance information on the three lines is essentially the same, so that that on line 1250 will cancel half the information on each of the other two lines leaving information of correct amplitude. A disadvantage with this arrangement is that the transfer function at frequencies midway between the line-locked chrominance and line-locked luminance provides a large undesired gain.

If these modifications are to be included, Table I is altered to the following Table II.

TABLE II

| State | Low Frequency | High Frequency |
|---|---|---|
| 1 | $\frac{1}{2}(Z^{-313}+Z^{-312})$ | $\frac{1}{2}(Z^{-314}-Z^{-312})$ |
| 2 | $Z^{-625}$ | $\frac{1}{2}(Z^{-624}-Z^{-626})$ |
| 3 | $\frac{1}{2}(Z^{-937}+Z^{-938})$ | $\frac{3}{4}Z^{-938}-\frac{1}{4}Z^{-936}$ |
| 4 | $Z^{-1250}$ | $Z^{-1249}-Z^{-1250}+Z^{-1251}$ |
| 5 | $\frac{1}{2}(Z^{-1562}+Z^{-1563})$ | $\frac{3}{4}Z^{-1562}-\frac{1}{4}Z^{-1564}$ |
| 6 | $Z^{-1875}$ | $\frac{1}{2}(Z^{-1876}-Z^{-1874})$ |
| 7 | $\frac{1}{2}(Z^{-2187}+Z^{-2188})$ | $\frac{1}{2}(Z^{-2186}-Z^{-2188})$ |

The lines used in Table II are ringed by dashed lines on FIG. 2. Given the principles described above, it will be appreciated that various alternative arrangements may be proposed.

For state 0, clearly no additional processing is required and the stored signal can be used directly.

Figure 3:
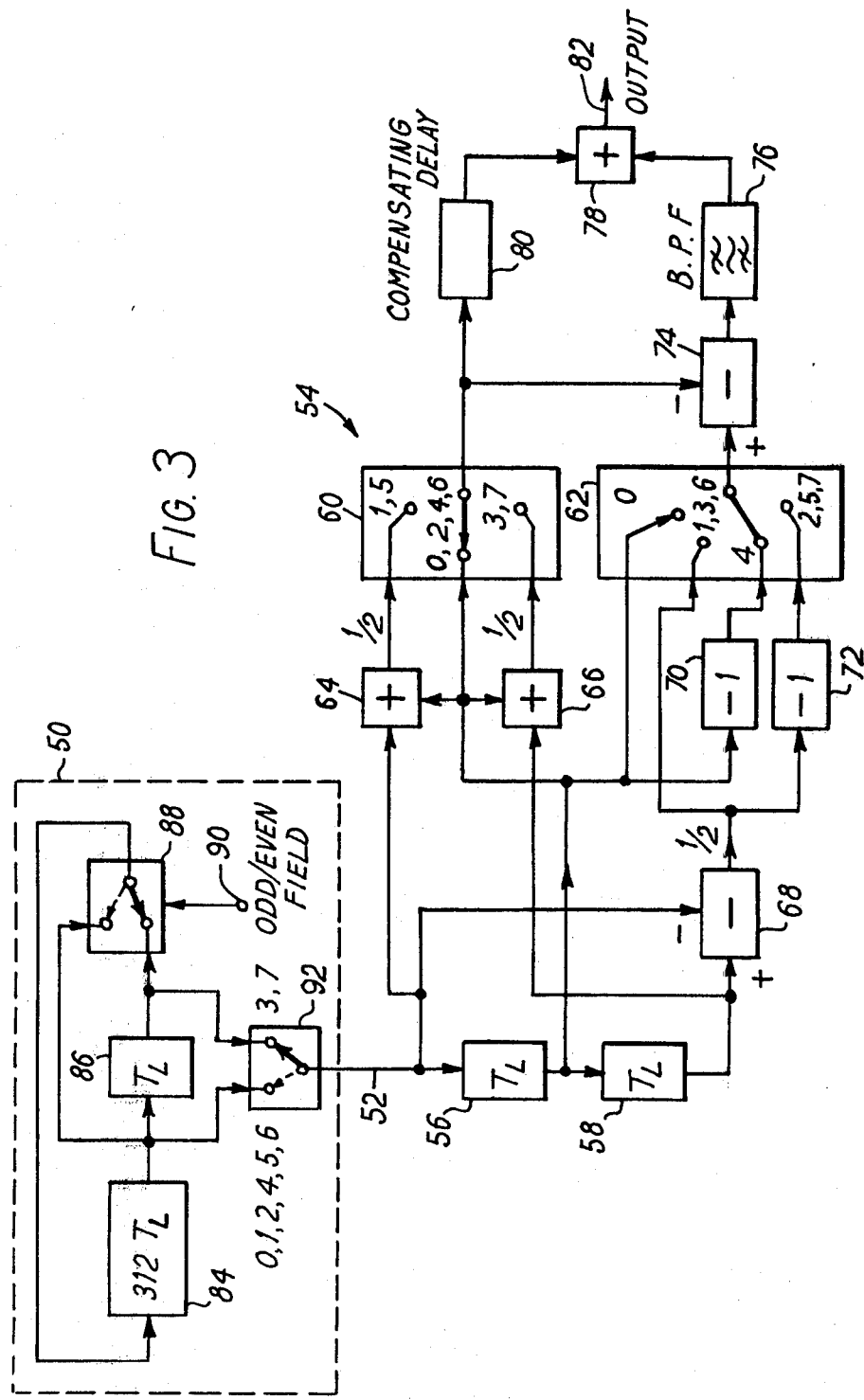
FIG. 3 is a block circuit diagram of apparatus embodying the invention for deriving a PAL signal corresponding to any field in an 8-field PAL sequence from one stored field of a PAL signal.

Reference is now made to FIG. 3 which shows an arrangement embodying the present invention in block form. The arrangement illustrated implements the method of Table I above.

The apparatus includes a one-field store 50, described in more detail below, the output of which is applied to an input 52 of apparatus 54 for deriving the 8-field PAL sequence from a single field stored in the store 50. The apparatus 54 is provided with two one-line delays 56 and 58 connected in series to the input 52, so that at any one time three successive lines are made available simultaneously. A selector switching unit 60 selects the combination of lines required to form the low-frequency part of each field and a selector switching unit 62 selects the combination of lines required to form the high-frequency part. To this end switching unit 60 has three inputs. The first input receives the output of a halving adder 64 which averages the signals at the input and output of the one-line delay 56. The second input receives the output of delay 56 unaltered. The third input receives the output of a halving adder 66 which averages the signals at the input and output of the one line delay 58. The switching unit 62 for the high frequency part of the signal has four inputs. The first input receives the output of delay 56. The second input receives the output of a halving subtractor 68 which subtracts the signal at the input 52 from the output of delay 58 and halves the resultant. The third input receives the output of an inverter 70 which is connected to the output of delay 56. The fourth input receives the output of an inverter 72 which is connected to the output of subtractor 68.

The positions of the switching units 60 and 62 for each of the states 0 to 7 of FIG. 2 are also shown within the blocks on FIG. 3. This it will be seen corresponds with Table I. The switching units 60 and 62 are switched during the field blanking periods on an 8-field cycle.

It will be appreciated that the switching units 60 and 62 operate with full-bandwidth signals. To combine the signals so that the low-frequency part of the signal from switching unit 60 is combined with high-frequency part of the signal from switching unit 62 requires the following steps. The output of unit 60 is subtracted from the output of unit 62 in a subtractor 74, and the subtractor output then filtered in a band-pass filter 76 which selects the chrominance frequency band of say 3.3 MHz to 5.5 MHz. In principle, a high-pass filter could be used. The output of filter 76 is then re-combined with the output of switching unit 60 in an adder 78. A compensating delay 80 is inserted in the path between switching unit 60 and adder 78 to allow for the delay introduced by the filter 76. The output 82 of adder 78 constitutes the circuit output.

Considering the output signal, all its low-frequency components will come from switching unit 60, as the filter 76 provides no output over this frequency range. Over the high-frequency region, the output consists of the input to adder 78 from unit 60, and the inputs to subtractor 74, namely the output of unit 62 and the inverse of the output from unit 60. The positive and negative of the output from unit 60 cancel to leave only the output from unit 62.

The construction of the store 50 has been illustrated in very simple and somewhat schematic form. The store includes a recirculating loop comprising a 312 line delay 84, and a one-line delay 86 which is alternately switched into and out of the loop by a switch 88 in accordance with a signal received at an input 90. Thus for odd fields the delay 86 is in the loop to give a loop delay of 313 lines and for even field the delay 86 is out of the loop to give a total delay of 312 lines.

The output of delay 84 is applied to the input 52 through a switch 92 which can select either the output of delay 84 or of the one-line delay 86. Alternatively a separate one-line delay which is not part of the loop may be connected to the output of delay 84. Considering Table I, the line numbers required at the input 52 to the apparatus 54 for each state are shown in the following Table III.

TABLE III

| State | Input Line Number | Modified Input Line Number |
|---|---|---|
| 1 | −312 | −312 |
| 2 | −624 | −624 |
| 3 | −936 | −937 |
| 4 | −1249 | −1249 |
| 5 | −1562 | −1562 |
| 6 | −1874 | −1874 |
| 7 | −2186 | −2187 |
| 0 | −2499 | −2499 |

If the input is derived from a recirculating loop of information as shown, the loop must alternate in length between 312 and 313 line periods. The line numbers corresponding to the age of the information will then increase by a quantity which alternates between 312 and 313 at each field. The second column of Table III shows this sequence, referred to an appropriate origin of time. It can be seen that an extra one line period of delay is required on states 3 and 7, and this can be provided by the arrangement of FIG. 3 where the switch 92 selects the output of delay 84 in all states except states 3 and 7, when it provides an extra one line of delay by taking the output of delay 86.

The store 50 could be replaced by a random access memory which contained a field of information. In this case if the memory is capable of outputting three lines simultaneously the delays 56 and 58 and the switch 92 can be omitted and replaced by corresponding outputs of the memory. The appropriate input line number pattern may be obtained by perturbing the read address sequence.

If the store is enlarged to accept a whole picture (two fields), the apparatus of FIG. 3 can still be used. However, it is then only necessary to consider the even number states 0, 2, 4 and 6.

The use of the circuit of FIG. 3 in apparatus for movement portrayal will now be described with reference to FIGS. 4 to 6. For further details reference should be made to our co-pending application No. 43,608 claiming priority from British patent application No. 23924/78 in which these figures are also included. The apparatus provides a simulation of the path of a moving object by showing a superposition of images at the positions which it occupies at selected instants of time.

Figure 4:
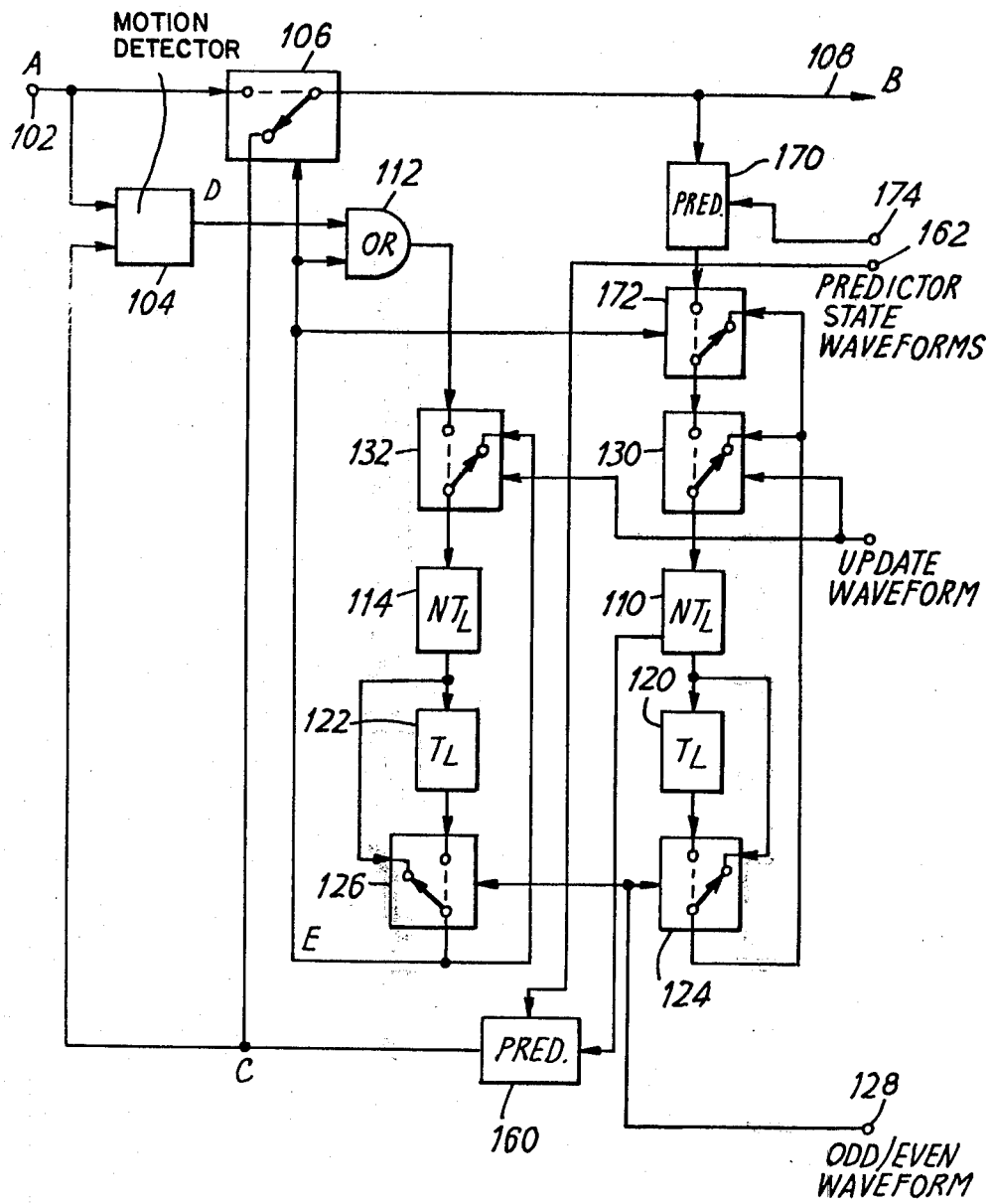
FIGS. 4 to 6 each show separate circuits which incorporate the apparatus of FIG. 3 and are used to portray movement of objects.
Figure 5:
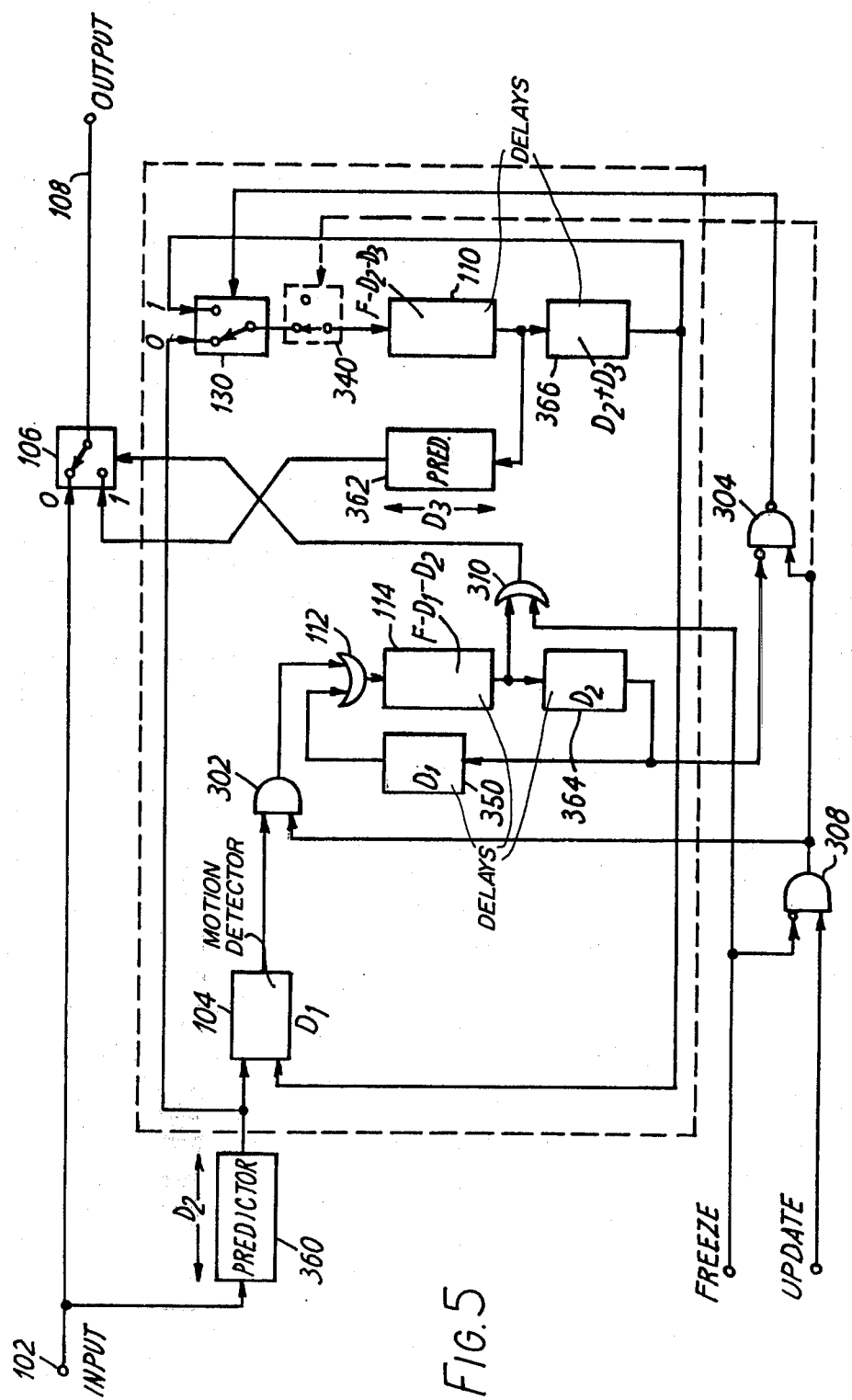
Figure 6:
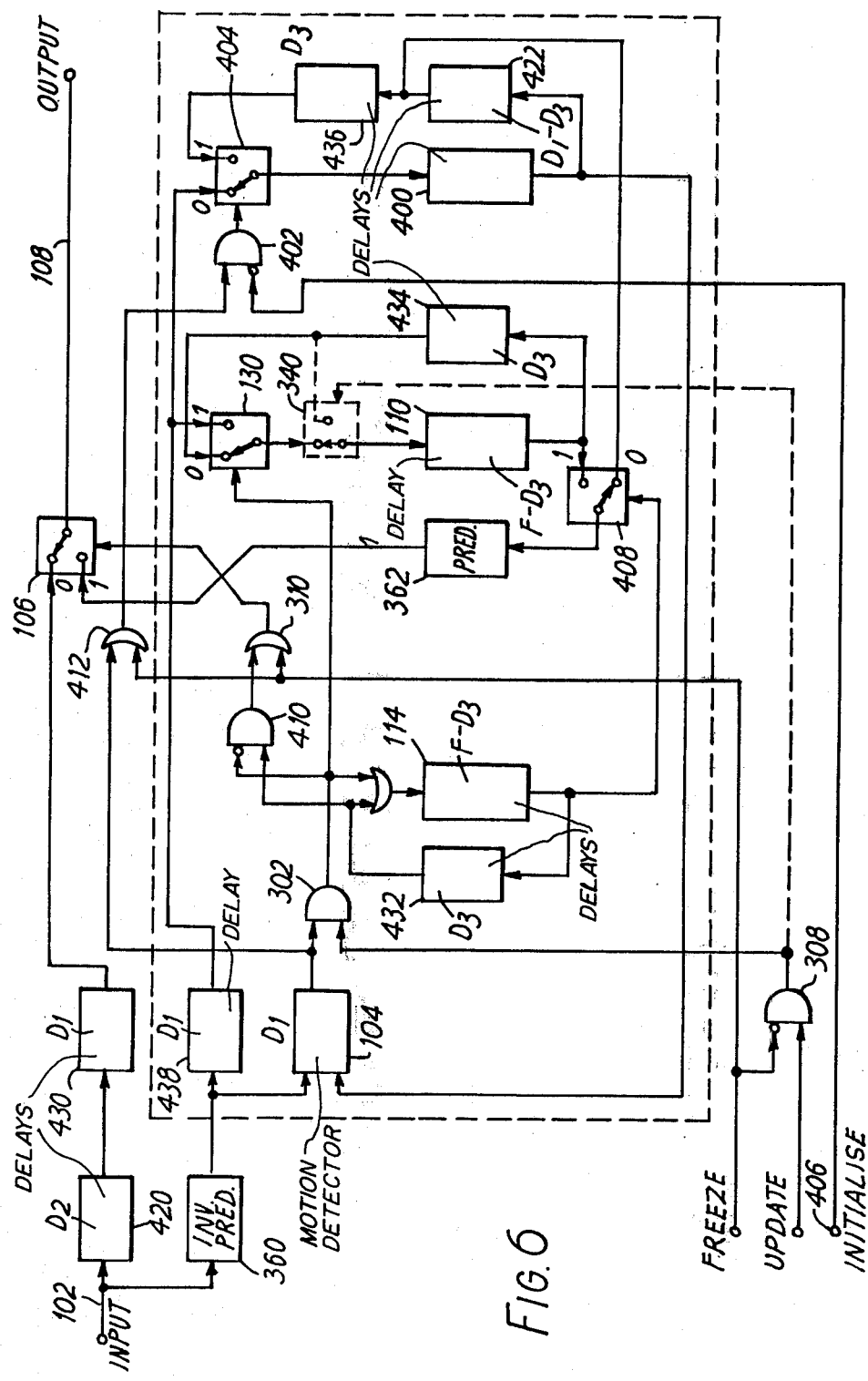

Broadly speaking, the basis of the apparatus of FIGS. 4 to 6 lies in the detection of field-to-field differences created by a moving object, together with the generation of a 'flag' signal indicating the position of such differences. When an object moves it creates two differences, the one being in its former position and the other in its new position. The flag is used to differentiate between old and new positions, for during each new scan every old position will already have been flagged and the positions of only the new differences will be unflagged. During old differences the old picture information corresponding to a previous field is transmitted to the output but during new differences the new picture information is transmitted. In this way the moving object is correctly displayed but, in addition, leaves images behind it.

FIG. 4 illustrates a first form of the apparatus. The apparatus has an input 102 connected to a motion detector 104 and to one input of a selector switch 106. One example of the motion detector is given in our aforementioned application. The output of switch 106 constitutes the output 108 of the apparatus and is also applied to the input of a one-field delay or image store 110. The output of the delay 110 is applied both to the other input of the motion detector 104 and to the other input of the switch 106. The output of the motion detector 104 is applied to an OR gate 112, the output of which is in turn fed to a one-field delay 114. Whereas the delay 110 stores the field in eight-bit digital form, the delay 114 has only one bit position for each picture element. The output of the auxiliary delay 114 is applied to control the selector switch 106.

The operation of the apparatus as thus-far described is as follows. It is assumed that an 8-bit PCM digital PAL System I television signal is received at the input 102. Any field-to-field difference is sensed by the motion detector 104, which takes feeds of the current input field signal from input 102 and the previous output field signal available from the one-field delay 110. The output of the detector 104 is a two-state signal indicating the presence or absence of movement, i.e. it takes the value 1 to 0 accordingly. It will be appreciated that such a detector will contain a threshold adjustment to guard against small differences due to noise, picture unsteadiness and small amounts of movement. The detector output signal thus "flags" all significant differences for the current field and is fed to the auxiliary delay 114, which has the same length as the main delay 110, after being gated in gate 112 with the flag signal for the previous field available at the output of delay 114. This flag signal indicates the position of "old" differences, and is used to switch the switch 106 from position A to position C whenever a flag occurs. In this way the old positions of any moving object or objects are transmitted to the output 108 and effectively keyed into the background. However, the new positions of the moving objects are also transmitted to the output with switch 106 in position A as their differences are not accompanied by a flag signal.

The length of delays 110 and 114 must be approximately one field period, for if it is otherwise then undesirable effects occur.

Given that the delay must be approximately one field period it must, in the simplest case, alternate between $NT_L$ and $(N+1)T_L$ where $T_L$ is the line period and a picture contains $2N+1$ lines. This is done by switching in and out of circuit extra one-line delays 120 and 122 using switches 124 and 126 respectively, which change over every field, as shown in FIG. 4, in response to a signal to a signal at an input 128.

It will be appreciated that the delays 110, 114, 120 and 122 can be realised digitally using shift registers or random access memories (RAMs). If RAMs are used the switches 124 and 126 are only notional, as the variation of delay can be achieved simply by perturbing the read address sequence of the RAMs.

The effect of the apparatus described so far is to display fixed images corresponding to intervals of one field period. Given the effect of camera integration, the multiple images will overlap somewhat and may not produce such an artistically desirable effect as if they were more separated. So, in general, the requirement is for fixed images corresponding to intervals of several field periods. This is achieved by renewing the contents of delays 110, 114, 120 and 122 at the selected intervals and recirculating the contents at all other times. Then, only the wanted picture material is stored, and the picture material and the flags it creates on the intermediate fields are ignored. The recirculation requires further switches 130 and 132 which are operated at the required updating rate. Switch 130 is connected at the input to delay 110 so as to supply either a signal from the output 108 or the signal at the output of switch 124, as determined by a signal at an input 134. Switch 132 likewise selects either the signal from gate 112 or the signal from switch 126. Because the recirculation is taken from points C and E the alternation of delay caused by switches 124 and 126 ensures correct picture periodicity of the recirculating information.

As before, if delays 110, 114, 120 and 122 are realised by using RAMs, the switches 130 and 132 are again notional, as it is only necessary to disable the writing process to ensure that the store contents are fixed. The update waveform then becomes the write enable waveform. However, the switches will continue to be shown and described as such, for ease of understanding.

For operation with composite colour signals suitable circuitry is provided to allow for the inherent field-to-field difference of the modulated colour information. This circuitry takes the form of a predictor circuit of the type shown in FIG. 3 and having several states, one for each field, which is able to make an estimate of the current field signal using information belonging to an earlier field.

In FIG. 4 the keyed information is written into the store 110 via a predictor 160 every time the store is updated. This predictor is as described above with reference to FIG. 3.

A second predictor 170 of like construction and auxiliary means for recirculating keyed information using a switch 172 are also included as shown in FIG. 4. The function of predictor 170 is to ensure that all the stored information is transformed to one field of the 8-field cycle, while predictor 160 transforms the information into the form appropriate to the current scan. As such, the state cycle of predictor 170 rotates in the opposite direction from that of predictor 160. For example, if we arbitrarily designate the stored information as being of field 0 form, then when the input is of field 3 form predictor 170 performs a 3 to 0 transformation and predictor 160 performs a 0 to 3 transformation. These transformations do not exactly cancel to produce unimpaired information.

The state cycles of the two predictors are now unaffected by the updating waveform and are never reset. The switch 172 prevents the keyed information from entering store 110 via predictor 170, and ensures that it is recirculated without further corruption. Thus, the displayed keyed information always passes only once through predictors 170 and 160. In this way, successive corruption is avoided, whilst allowing an updating period of any number of fields.

The systems of FIG. 4 displays the path of moving objects by showing a superposition of their images at selected, usually uniformly spaced, instants of time. The instant spacing will normally be dependent on the speed of movement of the objects and will require to be adjusted to obtain the best artistic effect. A further requirement is that the completed path should be capable of display with or without the background, for as long as desired, i.e. a "freeze" presentation.

FIG. 5 shows a rearrangement of the circuit of FIG. 4. An update gate 302 replaces switch 132 for the flag store 114. Switch 130 is connected to the circuit input instead of the output, but functions identically. Switch 130 is operated by the flag signal gated with the update waveform in a gate 304. A freeze signal can be applied at an input 306 to prevent updating of stores 110 and 114 via a gate 308, and overrides the flag via an OR gate 310, setting switch 106 to select the output of the image store 110.

As the flag at switches 106 and 130 must be synchronous with the input, discounting an arbitrary number of fields, the delay D1 of the movement detector 104 may be subtracted from the flag store 114. Thus, an extra delay 350 is required.

Two variable predictors 360, 362 operate in antiphase as described above. Most of the circuit thus operates with a single field phase of the composite signal cycle. As before, correct timing of the flag to switch 106 allows the delay of the inverse predictor 360 to be taken out of store 114, but correct timing of the flag to switch 130 requires a further delay 364. Correct timing of keyed information at switch 106 via predictor 362 requires store 110 to be shortened by the sum of the coder and decoder or predictor delays. This requires an extra store 366. It should be noted that the delay from input to output is nominally zero, and only keyed images suffer impairment due to prediction.

The systems of FIGS. 4 and 5 suffer from one disadvantage. This is that if the superposed images from two selected fields overlap, the older images obscure the newer ones. FIG. 6 shows an arrangement which overcomes this problem by making use of an additional one-field image store.

FIG. 6 shows an extra image store 400 used to store the image with which the current input is compared. Keyed images are stored in store 110 and flags in store 114. At the start, store 400 takes the initial field, under the control of a gate 402 and switch 404, the gate 402 being operated by an initialisation input 406. Thereafter store 400 only recirculates when a difference is detected in the motion detector 104 between the image in store 400 and the current image. Thus, it does not store the subsequent images of the moving objects but updates the background every field.

The positions of the moving objects enter store 114 and their images enter store 110 via switch 130. Then store 110 contains only the most recent moving images. It need not be cleared, but store 114 must be cleared before a track begins. As before, the flag output of store 114 controls switch 106 and causes it to select keyed images via a switch 408 instead of the input 102. An extra gate 410 allows a new flag to override an old flag, so that if the current position overlaps the old position, the current image is transmitted via switch 106 to the output. Also, switch 130 ensures that the new image overwrites the old image in store 110. This gives "normal obscuring".

The freeze signal inhibits updating via gate 308 and overrides the flag signal into switch 106 via gate 310 as described above. Also, the freeze signal overrides the flag signal into switch 404 via a gate 412, thereby causing the store 400 to recirculate its information. The frozen output signal is obtained via switch 106 and switch 408, which selects frozen keyed images or background according to the flag signal at the output of store 114. Hence, it is important that the flag signal is not destroyed during the freeze operation as it is needed to assemble the frozen picture.

As the flag control for switch 106 is derived via gate 410 which takes current information, it is not possible to allow for the delay in the movement detector 104 by shortening the flag store 114. Therefore, the image signals to switch 106 must be delayed. Thus, an extra delay 420 is required between the input 102 and switch 106 equal to that of the detector 104. Correct relative timing of the two detector inputs requires the output of store 400 to be shortened by the same delay, so that an extra delay 422 is also required.

Finally, the delay of the inverse predictor 360 cannot be accommodated in store 114 because the flag to switch 106 contains current information. Thus, an extra compensating delay 430 must be present in the image feed to switch 106. Correct timing of the flag into switch 408 requires store 114 to be shortened by the delay of the predictor 362. Hence, an extra delay 432 is required. Similarly, correct timing for image signals into switch 408 requires stores 110 and 422 to be shortened by the same delay. Hence, extra delays 434 and 436 are required. Also, a delay 438 is included between the predictor 360 and switch 404 to compensate for the movement detector delay.

The overall delay from input to output is the sum of the movement detector delay and the inverse predictor delay. Only keyed images suffer the impairment of cascaded predictors during path development.

For further details of FIGS. 4 to 6, reference is again made to the aforementioned application.

We claim:

1. A method of deriving a PAL color television signal corresponding to any field in an 8-field PAL sequence from one stored field or picture of a PAL signal, comprising:

providing a first selected combination of signals from more than one line of said stored field to form a first part of said signal containing at least the low-frequency components thereof;

separately providing a second selected combination of signals from more than one line of said stored field to form a second part of said signal containing only chrominance components thereof such that successive fields have the sub-carrier phase appropriate to the respective successive fields of a PAL signal; and combining said first and second parts to form said derived signal.

2. A method according to claim 1, for deriving a PAL sequence from one stored field, in which for alternate ones of the fields the said low-frequency part of each line comprises the average of two adjacent stored lines.

3. A method according to claim 1, wherein for at least some fields of the sequence the said chrominance part of the signal is formed by combining stored signals which are two lines apart.

4. A method according to claim 3, wherein for at least some fields of the sequence the said chrominance part of the signal is formed by subtracting stored signals which are two lines apart, and halving the resultant.

5. A method according to claim 1 wherein said first and second parts of the signal are formed in accordance with the following table:

TABLE I

| State | First Part | Second Part |
|-------|------------|-------------|
| 1 | $\frac{1}{2}(Z^{-313}+Z^{-312})$ | $\frac{1}{2}(Z^{-314}-Z^{-312})$ |
| 2 | $Z^{-625}$ | $\frac{1}{2}(Z^{-624}-Z^{-626})$ |
| 3 | $\frac{1}{2}(Z^{-937}+Z^{-938})$ | $\frac{1}{2}(Z^{-938}-Z^{-936})$ |
| 4 | $Z^{-1250}$ | $-Z^{-1250}$ |
| 5 | $\frac{1}{2}(Z^{-1562}+Z^{-1563})$ | $\frac{1}{2}(Z^{-1562}-Z^{-1564})$ |
| 6 | $Z^{1875}$ | $\frac{1}{2}(Z^{-1876}-Z^{-1874})$ |
| 7 | $\frac{1}{2}(Z^{-2187}+Z^{-2188})$ | $\frac{1}{2}(Z^{-2186}-Z^{-2188})$ | wherein the designation State represents the number of the field, previous to the reference field which is to be produced, which is used for producing said reference field and symbols of the form $Z^{-N}$ represent the transfer function Z of N line periods delay.

6. A method according to claim 1 wherein said first and second parts of the signal are formed in accordance with the following table:

TABLE II

| State | First Part | Second Part |
|---|---|---|
| 1 | $\frac{1}{2}(Z^{-313}+Z^{-312})$ | $\frac{1}{2}(Z^{-314}-Z^{-312})$ |
| 2 | $Z^{-625}$ | $\frac{1}{2}(Z^{-624}-Z^{-626})$ |
| 3 | $\frac{1}{2}(Z^{-937}+Z^{-938})$ | $\frac{3}{4}Z^{-938}-\frac{1}{4}Z^{-936}$ |
| 4 | $Z^{-1250}$ | $Z^{-1249}-Z^{-1250}+Z^{-1251}$ |
| 5 | $\frac{1}{2}(Z^{-1562}+Z^{-1563})$ | $\frac{3}{4}Z^{-1562}-\frac{1}{4}Z^{-1564}$ |
| 6 | $Z^{-1875}$ | $\frac{1}{2}(Z^{-1876}-Z^{-1874})$ |
| 7 | $\frac{1}{2}(Z^{-2187}+Z^{-2188})$ | $\frac{1}{2}(Z^{-2186}-Z^{-2188})$ | wherein the designation State represents the number of the field, previous to the reference field which is to be produced, which is used for producing said reference field and symbols of the form $Z^{-N}$ represent the transfer function Z of N line periods delay.

7. Apparatus for deriving a PAL colour television signal corresponding to any field in an 8-field PAL sequence from one stored field or picture of a PAL signal, comprising:

first means for receiving input PAL signals from a store and for making avilable simultaneously more than one line; and second means for providing a first selected combination of signals from more than one line of said stored field to form a first part of said signal containing at least the low-frequency components thereof, for separately providing a second selected combination of signals from more than one line of said stored field to form a second part of said signal containing only the chrominance components thereof such that successive fields have the subcarrier phase appropriate to the respective successive fields of a PAL signal, and for combining said first and second parts to form said derived signal.

8. Apparatus according to claim 7, comprising an input terminal for receiving an input PAL signal, and delay means connected to the input terminal to delay the input signal by an integral number of lines.

9. Apparatus according to claim 8, wherein the delay means provides two outputs delayed by one and two lines respectively.

10. Apparatus according to claim 8, wherein the delay means is provided with means for selectively introducing an additional one-line delay.

11. Apparatus according to claim 7, wherein the first means comprises a random access store for containing a field or picture of a PAL signal and capable of outputting two or more lines simultaneously.

12. Apparatus according to claim 7, wherein the second means includes means operative to average two successive lines.

13. Apparatus according to claim 7, wherein the second means includes means operative to generate half the difference between two lines which are two lines apart.

14. Apparatus according to claim 7, wherein the second means comprises a first selector for selecting said first combination of signals, a second selector for selecting said second combination of signals, and means for combining the low-frequency part of the output of the first selector with the chrominance part of the output of the second selector.

15. Apparatus according to claim 14, wherein the last-mentioned means comprises a subtractor having its inverting input coupled to the output of the first selector, its non-inverting input coupled to the output of the second selector, and said combining means includes an adder, the output of said subtractor being coupled through a frequency selective filter to one input of said adder, the other input of which is coupled to the output of the first selector.

* * * * *